United States Patent

Murphy

[15] 3,702,493
[45] Nov. 14, 1972

[54] METHOD OF MAKING AN ELECTRET
[72] Inventor: Preston V. Murphy, Weston, Mass.
[73] Assignee: Thermo Electron Corporation, Waltham, Mass.
[22] Filed: March 4, 1971
[21] Appl. No.: 120,858

Related U.S. Application Data

[60] Division of Ser. No. 25,539, April 3, 1970, Pat. No. 3,612,778, Continuation-in-part of Ser. No. 638,463, May 15, 1967, abandoned.

[52] U.S. Cl..................................................29/592
[51] Int. Cl................................................H01s 4/00
[58] Field of Search......29/592; 179/111 E, DIG. 10; 313/231, 161; 340/88 ET

[56] References Cited

UNITED STATES PATENTS

3,177,654   4/1965   Gradecak..............313/161 X

OTHER PUBLICATIONS

Hyypia, The Electret, Electronics Illustrated, January 1970, pp. 97–99.
Gross, Charge Storage in Solid Dielectrics, 1964, p. 6.

Primary Examiner—Charles W. Lanham
Assistant Examiner—D. M. Heist
Attorney—James L. Neal

[57] ABSTRACT

A method of making electrets, comprising the steps of (1) internal polarization of a selected thermoplastic using an ionized gas, produced by a high frequency electric field, to contact one surface and serve as one electrode while a metal film serves as a second electrode, and applying a constant electric bias while the material is heated to a softened condition and then gradually cooled, and (2) by a secondary process, applying an electrostatic charge to the exposed dielectric surface of the electret.

9 Claims, 6 Drawing Figures

PATENTED NOV 14 1972　　　　　　　　　　　　　　3,702,493

INVENTOR
PRESTON V. MURPHY
BY
James L. Neal
ATTORNEY

METHOD OF MAKING AN ELECTRET

This application is a divisional of co-pending application Ser. No. 25,539, filed Apr. 3, 1970 in the name of Preston V. Murphy and entitled "Electroacoustic Transducers and Method of Making the Same", now U.S. Pat. No. 3,612,778. The aforesaid co-pending application is a continuation in-part of Preston V. Murphy application entitled "Electroacoustic Transducers and Method of Making the Same," Ser. No. 638,463, filed May 15, 1967, now abandoned.

My invention relates generally to electrostatic devices and particularly to a novel method of making electrets and to novel electroacoustic trans-ducer constructions employing the same.

In order to obtain satisfactory linearity of response in electrostatic transducers such as condenser microphones, electrostatic speakers, vibration transducers and the like, it is necessary to provide a relatively high DC bias on the transducer. It has long been known that, in principle, the necessary bias can be provided by using an electret having a metallized surface as the active element of the transducer.

An electret is a dielectric material that has been subjected to a sufficiently intense electrostatic field to produce a residual internal polarization that persists after the field is removed. The result is an electrostatic charge in the material that serves to supply the necessary DC bias for an electrostatic transducer.

In practice, a number of problems have been encountered in the manufacture and use of electrets that have precluded their widespread adoption. The principal difficulty has been that electrets made from the materials, and by the methods, known prior to my invention have lacked good polarization stability. Extremes of temperature and humidity cause drastic and rapid losses in polarization. Even under controlled conditions, however, the internal charge of conventional electrets gradually decreases at rates too great to be acceptable for most purposes.

Another problem encountered arises from the necessity of including the dielectric material of the electret between the conducting metallic portions of the electrodes of the transducer. The physical thickness of the electret inherently limits the capacitance of the transducer. Early forms of electrets, such as those comprising electrified wax discs, were inherently so limited in this respect that stray capacitances, such as the capacitances between the leads of associated electronic circuits, precluded satisfactory performance.

It has been proposed to solve both problems by making electrets from a thin film such as polyethylene terepthalate, commercially available as Mylar film. Transducers made with electrets of Mylar film do indeed exhibit sufficiently high driving capacitance that stray capacitance in associated circuits does not present a serious problem, and such transducers can be used in relatively low impedance transistor circuits. However, I have found that the apparent polarization stability of such transducers is at least in some part an illusion produced by malfunctioning of the transducer.

Specifically, I have made and tested electrostatic transducers using electrets made from Mylar film. The film is metallized on one side to provide one electrode serving as the diaphragm of a transducer, and confronts on the other side a metal backplate comprising the other electrode of the transducer.

In order to take advantage of the thin Mylar film to obtain high driving capacitance, the electret diaphragm is necessarily mounted very close to the backplate. I have found that in conventionally constructed transducers of this kind, there is a marked tendency for the diaphragm to stick to the backplate when the electret is highly electrified. Such a transducer is initially greatly limited in response by this sticking.

If the sticking just described was the only effect involved, the transducer would exhibit a gradual increase of response as the electret lost polarization, until the sticking problem disappeared and the diaphragm was completely free to vibrate. Thereafter, a continual decrease in response would be found as the electret continued to deteriorate. However, other effects mask this process and give an illusion of stability of response.

First, the diaphragm comprising the electret, initially under tension, tends to relax with time. Thus, the initial response of the transducer, if the electret is not initially too strongly electrified, is improved by the taut diaphragm. As the diaphragm gradually relaxes, the loss in tension tends to reduce response, masking the improvement caused by gradual reduction in sticking, so that the net response seems stable. Furthermore, the loss of charge with time tends to compensate in the same manner: the diaphragm tends to stick less because of the decreased electrostatic force, increasing the sensitivity, but the lower charge decreases the sensitivity. In fortuitous cases these compensating factors may result in stable performance for 12 to 18 months, but the sensitivity decreases drastically thereafter.

The objects of my invention are to improve the performance, simplify the construction and reduce the cost of electroacoustic transducers. It will be apparent from the above discussion that those objects could be attained in a transducer of the electret biased type if the charge stability of electrets could be improved and the tendency for electrostatic sticking could be reduced. Accordingly, particular objects of my invention are to increase the charge stability of electrets, and to minimize electrostatic sticking in electret transducers.

The above and other objects of my invention are attained by a novel transducer construction of my invention incorporating at least two electrodes and an electret of novel construction manufactured in accordance with a new process of my invention.

One of the electrodes in the transducer of my invention is modified by the formation on its surface of integral support elements adapted to contact the electret, and thereby perform two functions. The first is to permit very close but carefully controlled spacing of the electrodes and thereby attain a high sensitivity. The second is to permit the use of a strong electret without the loss of response attendant upon the sticking of the electret to the other electrode.

A regular support pattern embossed on the backplate provides multiple support for the diaphragm and in a sense produces multiple microphone elements in parallel. Each element is optimized with respect to spacer height and cell area for high sensitivity, and appropriate compliance and acoustic resistance.

The electret of my invention is preferably made from a thermoplastic polymeric dielectric material selected from the class consisting of films of polycarbonates, polymides, polyhalocarbons, polyphenylene oxide, polysulfone, polyvinylidine chloride and their copolymers. I have found such films to make electrets of surprisingly good charge stability, as compared with such apparently similar films as those of Mylar and the like. In some instances, the basic film is of a material selected from the above class on which a surface coating of the class consisting of polymers and copolymers of styrene, halocarbons and vinylidine chloride is formed, the coating being dissimilar to the film, however. I have found that materials of this class are surprisingly superior to other materials in their ability to assume and maintain a surface electrostatic charge. While for some purposes the dielectric material may be used alone, for use in the transducers of my invention, it is metallized on one side in any conventional manner known to the art, or bonded to a metal sheet or foil.

While I have found that a number of polymer films from the generic classes listed above are superior to Mylar in electret properties, the best performance has been obtained with the fluorohalocarbon film sold commercially by the Allied Chemical Corporation under the trade name Aclar. In fact, there are at least two forms of Aclar available: Aclar 33 C which is believed to be 97—98 percent poly (chlorotrifluoroethylene) with 2—3 percent tetrafluoroethylene added as a copolymer and Aclar 22 C which is believed to be 97—98 percent poly (chlorotrifluoroethylene) with 2—3 percent vinylidene fluoride and tetrafluoroethylene added to give a terepolymer. I prefer to use Aclar 33 C which currently is available in thicknesses of 0.0005, 0.00075 and 0.001; Aclar 22 C which is available in 0.001 thickness also has given satisfactory performance.

While Aclar possesses several advantages for use as an electret material, the most outstanding advantage which sets it apart from all other available materials is the stability of its charge under the prevailing environmental extremes of temperature and humidity. High humidity (90–95 percent) has been found to be the single most important cause of electret charge loss; moisture permeates all plastic films, more or less, absorbs and cause charge leakage. Aclar has the smallest moisture permeability and absorptivity of any polymer and I have found that high humidity does not cause loss of charge for Aclar. (No measurable loss of charge after 1 year at 92 percent RH). Furthermore, Aclar is a temperature resistant polymer and charge is not lost during severe military environmental testing which requires prolonged exposure to 71°C and 95 percent relative humidity (MIL-STD 810 A). Finally, Aclar has outstanding mechanical properties; for example, the tensile strength is double that of FEP Teflon, thus permitting high tension on microphone diaphragms, and the film can be bonded readily to retainers or substrates using either adhesives (epoxies) or thermal bonding techniques.

The electret is prepared from a film or sheet of the selected material by a two-step process of my invention. In the process, the dielectric material is first internally polarized by subjecting it to a high DC field while the material is heated to a temperature at which it is relatively soft. By "relatively soft," I mean the plastic amorphous state in which the material can be formed, and in which it exhibits no substantial tensile strength. A metal electrode is permanently attached to one side of the dielectric material and an ionized gas (air, inert gases, or other gases), produced by an AC source of radio frequency voltage or by a DC corona discharge, contacts the other side during electrification. The field is maintained while the material is cooled slowly to the solid state. By "solid state," I mean the state in which the material exhibits the properties of tensile strength and flexibility characteristic of sheet or film material as normally specified for use as such. Next, the surface of the internally polarized electret is given a surface charge. This surface charge may be applied either by increasing the DC field to very high values, greater than $10_5$ volts/cm, while maintaining the contact between the ionized gas and the exposed dielectric surface or by rubbing the dielectric surface with a material of opposite charge selectivity. I have found that a very strong and stable electret can be produced in this manner.

The manner in which the method of my invention is best carried out, and the details of the apparatus of my invention, will best be understood in the light of the following detailed description, together with the accompanying drawings, of various illustrative embodiments thereof.

In accordance with my invention, the dielectric material from which an electret is made is selected on the basis of two properties. The first is the ability to assume and maintain an internal, or bulk, electrostatic charge. A dielectric material best suited for bulk polarization has a polar molecular structure, low mobility for charge transport and diffusion, a high concentration of deep traps for ions and electrons, and a high glass or crystalline transition temperature. A second basic desirable property is the ability to assume and maintain a surface charge. For that purpose, the material should have high resistivity, proper charge selectivity and low vapor absorption. Of the vast array of available dielectrics, I have found that commercially available polycarbonate, polyimide, polyhalocarbon, polyphenylene oxide, polysulfone and polyvinylidine chloride sheets and films, and sheets and films of copolymers of those materials, are surprisingly well suited to the manufacture of electrets, in that they all exhibit to an unexpected degree the desirable properties needed for both bulk and surface polarization. These materials may be further improved by surface treatment to give improved surface polarization properties. The surface properties of films of polystyrene and its derivatives, polyhalocarbons, and polyvinylidine chloride are especially good. If these materials are coated on, or copolymerized at the surface with, the material selected for the body of the electret, a material having superior bulk and surface properties can be made.

Figure 1:
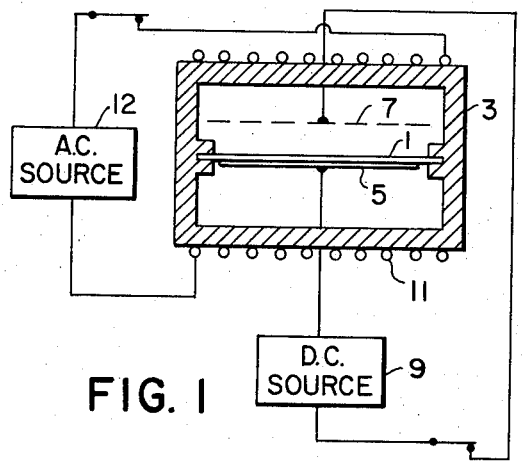
FIGS. 1 and 2 are schematic views, with parts shown in cross-section, of apparatus for carrying out a step in the process of manufacturing an electret in accordance with my invention.

The method of making an electret from the selected material in accordance with my invention makes use of both bulk and surface polarization. FIG. 1 illustrates the first step in the process, namely the bulk polarization of the selected material.

The dielectric material 1, in the form of a film or sheet, is suspended as schematically indicated within a suitable furnace 3. The material 1 is provided with a metallic coating on its lower surface as seen in FIG. 1, and the metallic coating is in direct mechanical and electrical contact with the first electrode 5. Spaced above the dielectric material 1 is a second electrode 7, in the form of a grid.

A conventional DC source of high voltage, shown schematically at 9, is connected between the electrodes 5 and 7. The DC source 9 should be capable of producing a DC field strength of about 10 kilovolts per centimeter in the region between the electrodes 5 and 7 in which the material 1 is located.

While the furnace 3 may be heated in other ways, preferably an induction heating coil 11 is provided. The coil 11 is disposed in any convenient way surrounding the dielectric material and the electrodes 5 and 7. It may be energized by a conventional AC source of radio frequency voltage shown schematically at 12. The field produced by the coil 11 should be sufficient, not only to heat the dielectric material 1 to the desired temperature, but to produce substantial ionization in the gas, such as air or the like, in the furnace. This ionized gas provides a plasma electrode of greatly reduced impedance relative to the impedance of the unionized gas, and serves to connect the electrode 7 to the upper surface of the dielectric material 1. I have found that this arrangement produces a more uniform surface charge on the dielectric material than could be produced by continuous electrode in direct contact with the dielectric surface, and avoids the problems inherent in the latter arrangement that result from local breakdowns in the dielectric.

If means other than an induction field is used as a heat source, the AC field needed to produce ionization can be provided by a screen grid located above the screen 5 in the furnace 3, and the AC source connected between that screen and the electrode 5. Alternatively, the AC source could be connected between the electrode 5 and 7 with conventional means provided to isolate the AC and DC sources. It might be supposed that the alternating field would have no effect or would detract from the effect of the DC field, but I found that a higher degree of polarization can be attained by the use of the superimposed fields. The material 1 is heated to a temperature at which it is relatively soft, such as 250° C for a polycarbonate dielectric; or 120°C for Aclar. It is maintained at that temperature in the superimposed fields for from 10 to 100 minutes. The heat is then turned off, while the DC field is maintained for an hour or two while the material cools to room temperature.

After the bulk polarization just described, the electrostatically charged material 1 is given a surface charge. The dielectric surface on the side opposite the metal coating may be charged to the selected polarity either by exposing the material to an ionized gas produced as before, by corona or an AC field while a very high bias is applied, or by rubbing it with another material selected in a known way to exhibit an opposite charge selectivity. In the preferred procedure, the DC bias from the source 9 is increased to produce a field of about 200 kV/cm in the material 1. A net charge, defined as the surface charge minus the bulk polarization, of $10^{-8}$ to $10^{-7}$ coulombs per square centimeter has been produced routinely by this procedure.

Figure 2:
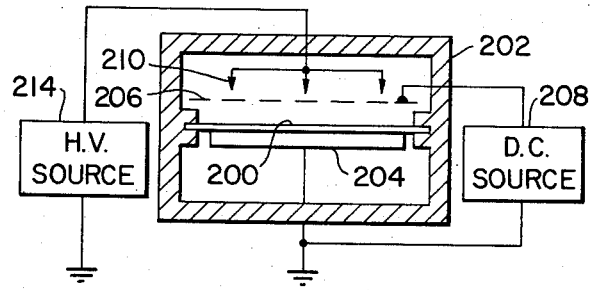

In FIG. 2 there is shown an experimental arrangement used for making the electret by the technique described above in which the induction field is substituted by independent means for heating and producing ionization. Again, the material in the form of a sheet 200 is suspended in a suitable furnace to be softened to the desired degree as outlined hereinabove. A flat metallic electrode 204 which may be at ground potential is disposed beneath the material 200. Above the sheet 200 is a control grid 206 to which the high potential terminal of a DC voltage source 208 is connected. A corona electrode 210 penetrates the furnace wall and has its active element above the grid 206. A high voltage source 214 of corona voltage, which may be either AC or DC is connected between the corona electrode 210 and ground.

The process of charging the electret material with the apparatus of FIG. 2 is similar to that using the apparatus of FIG. 1 except that any suitable heating method may be used while the corona discharge produces ionization of the gas in the furnace to charge the material.

Figure 3:
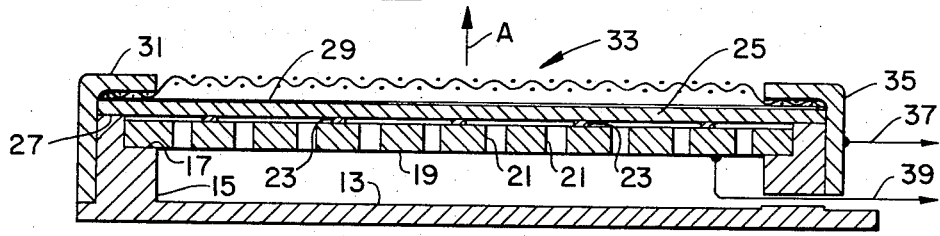
FIG. 3 is a cross-sectional elevation of a transducer in accordance with my invention.
Figure 4:
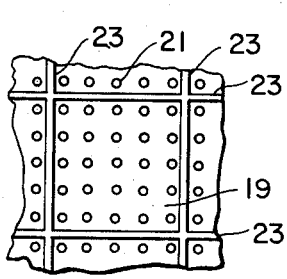
FIG. 4 is a fragmentary plan view on an enlarged scale of a portion of an electret backplate forming a part of the apparatus of FIG. 3.

FIGS. 3 and 4 show an electrostatic transducer incorporating an electret preferably made by the process just described. The apparatus of FIG. 3 is symmetrical about the axis A, with minor exceptions that will be apparent from FIGS. 3 and 4, and so its construction can be understood from the single view.

An embodiment of a transducer incorporating the above described electret includes a base plate 13 of plastic or the like, provided with an upstanding annular flange 15. The flange 15 is formed with a ledge 17 to support a metal backplate 19. The backplate 19 is perforated with a series of apertures such as 21, preferably by chemical milling. The apertures 21 are preferably about 5 mils in diameter and spaced on 15 mil centers, although various other sizes and spacings may be employed. The apertures serve to provide an air passage through the backplate, allowing the space between the backplate and the baseplate 13 to serve as an acoustic compression chamber.

On the upper surface of the backplate 19 is formed a mesh of fine metal wires 23, of electroformed nickel or the like, and preferably about one-fourth mil in diameter. The wires 23 are preferably spaced from 40 to 100 mils apart and are secured in any conventional manner, as by welding or the like, to the backplate 19. The height and area of each element may be designed so that electrostatic forces from the electret do not overcome restoring forces provided by foil tension and thereby cause the foil to stick to the recessed part of the backplate. Appropriate dimensions are 1 mil height, 50 mil × 50 mil area, with one or more holes in the center of total area equal to about 18 percent of the cell area. Alternatively, the wires 23 may be formed integrally with the backplate. Still another suitably alternative is to replace the wires 23 by a series of raised posts, formed integrally with the backplate. These posts are preferably from one-eighth to one-half mil in height, from 2 to 5 mils in diameter, and spaced from 20 to 60 mils apart. Alternatively, the backplate including the support grid can be fabricated by injection molding of plastic followed be metallizing to provide conductivity.

Above the backplate 19 is an electret diaphragm generally designated 25 having an exposed dielectric surface 27 and an upper metallized surface 29. The diaphragm 25 may be slightly spaced from or in contact with the wires 23, but in any event the latter limit the minimum spacing between the diaphragm and the backplate and prevent the diaphragm from electrostatically sticking to the backplate.

As a result of the presence of the metallized plastic, wire grid or metals posts, a large number of individually reacting transducer cells are formed. These cells control the compliance and resistance of the diaphragm and facilitate the optimization of sensitivity and frequency response.

The diaphragm is held in place by the annular rim 31 of a protective metal screen 33 and an outer metal cap 35 that serve to clamp the diaphragm against the flange 15. The cap 35 may be secured to the baseplate 13 in any suitable conventional manner, as by threading the parts, or with an adhesive or the like.

Electrical connections to the transducer of FIG. 2 may be made in various conventional ways. As shown, one lead 37 may be connected to the metal cap 35, making contact with the metal surface 29 of the diaphragm 35 through the cap 35 and the screen 33. A second lead 39 may be connected directly to the backplate 19 and taken out through suitable passages in the base plate and cap as indicated, with conventional provision for insulation, not shown.

Figure 5:
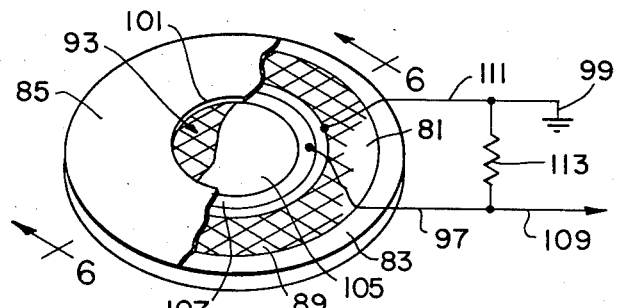
FIG. 5 is a schematic perspective sketch, with parts shown diagrammatically and parts broken away, of a transducer in accordance with another embodiment of my invention.
Figure 6:
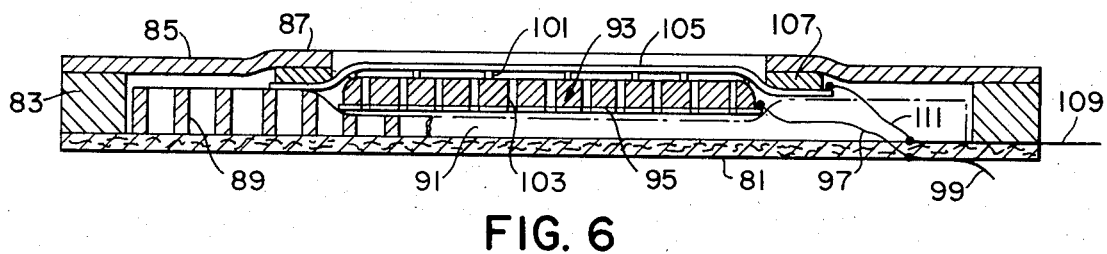
FIG. 6 is a schematic cross-sectional diagram, with parts shown on an enlarged scale relative to other parts and with all parts on a larger scale, of the transducer of FIG. 5, taken substantially along the lines 6—6 in FIG. 5.

FIGS. 5 and 6 show another embodiment of the transducer of my invention that has the advantages of great simplicity of construction and long polarization lifetime. The base of the apparatus is formed by a disc 81 of non-porous conducting material.

Supported on and secured to the disc 81 in a conventional way is a plastic spacing ring 83. Mounted on and secured to the ring 83 in a plastic retaining ring 85 provided with an inner raised flange portion 87.

Supported on the plate 81 is a molded plastic mesh screen 89 having a recessed central portion 91 which receives and supports a disc of electret material generally designated 93. In this embodiment of my invention, the electret disc 93 is bonded to the stationary electrode in the transducer.

The electret disc 93 is provided with a metallized bottom layer 95 connected to the bottom side of the paper plate 81 by a lead 97 and a contact plate 99. The remainder of the electret disc 93 is made from a relatively thick film of one of the plastic materials suggested hereinabove about 9 mils in thickness. Alternatively, a conventional spacer may be used to keep the foil from contacting the electret which is incorporated in the backplate.

The film is preferably embossed to provide a raised grid of support elements 101 approximately one-fourth mil in height. The film is provided with apertures such as 103 for acoustic communication with the chamber formed by the spaces between the elements of the plastic mesh screen 89 and the space above the electret 93. As described above, these apertures 103 may be of about 5 mils in diameter and on centers of about 15 mils. The electret disc 93 may be polarized and charged in the manner described above and, again, individual reacting cells are formed.

The movable diaphragm for the transducer of FIGS. 6 and 7 comprise a metallized pastic foil 105 mounted between the flange 87 and the upper surface of the plastic mesh screen 89 by means of an intermediate metal mounting ring 107. The upper surface of the diaphragm 105, as seen in FIGS. 5 and 6, is a metallized surface. Alternatively, the entire diaphragm 105 may be made of thin metal foil.

The diaphragm 105 is connected to an external contact 109 by means of a lead 111. The contact 109 is also in electrical contact with the upper surface of the conducting backplate 81, so that the effective circuit is as shown in FIG. 5, in which a resistor 113 represents the resistance of the conductive backplate 81. If the device is mounted with the plate 81 in contact with a metal chassis, the contact 99 would serve as ground and the active output terminal would be 109.

The apparatus of FIGS. 5 and 6 is readily manufactured by conventional plastic molding techniques. In addition, the use of the electret disc 93 as a stationary electrode makes possible a more massive construction. With such a construction, polarization lifetime is increased, because internal short circuiting is more effective in the thicker structure. For example, with the dimensions described, a polarization lifetime of 25 times the lifetime of the ¼ mil electret foil has been found.

While I have described my invention with respect to the details of various specific embodiments thereof, many changes and variations will be apparent to those skilled in the art upon reading my description, and such can obviously be made without departing from the scope of my invention.

I claim:

1. In a method of making an electret, the steps of heating a thermoplastic dielectric material to a softened state, exposing one surface of the heated material to gas ions formed by a corona discharge, controlling the electrical potential at said surface of the heated material by means of a screen grid, maintaining a potential difference across the heated material by means of a DC bias between the screen grid and an electrode fixed to the opposite surface of the heated material, said bias being sufficient to cause both substantial bulk polarization and substantial surface charging of the heated material, and finally cooling the material while continuing the DC bias and corona discharge.

2. In a method of making an electret, the steps of heating a thermoplastic dielectric material to a softened state; exposing one surface of the heated material to gas ions which serve as an electrical conductor between said one surface and one terminal of a source of potential difference spaced from said one surface, wherein said gas ions fill the space separating said one surface and said one terminal; maintaining a potential difference across said space and said heated material, thereby establishing a substantially uniform electrical potential at said one surface of said heated material, said potential difference being sufficient to cause polarization of said heated material; and finally cooling said material while continuing to maintain said potential difference and said exposure of said one surface to gas ions.

3. The method according to claim 2 wherein said gas is ionized by a corona discharge and said corona discharge is continued during said cooling step.

4. In a method of making an electret, the steps of exposing one surface of a polymeric dielectric material to a corona discharge which establishes an electrically conductive gas layer adjacent said one surface and simultaneously maintaining a potential difference across the dielectric material and said electrically conductive gas layer by means of one electrode immersed in said electrically conductive gas layer and another electrode adjacent the opposite side of said material.

5. The method of claim 2 wherein said one terminal comprises grid means further comprising the step of controlling by means of said grid means the charge uniformity along the portion of said material facing said grid means, while maintaining said potential difference across said space and said material by means of a DC bias between said grid means and another terminal adjacent the surface of said material opposite said one surface.

6. The method according to claim 2 wherein said gas is inert.

7. The method according to claim 2 wherein said gas ions are produced by a high frequency alternating field adjacent said dielectric material.

8. The method according to claim 7 wherein said high frequency alternating field is produced by an induction heating coil surrounding said dielectric material.

9. The method according to claim 8 wherein said dielectric material is heated by said induction heating coil.

* * * * *